(12) United States Patent
Mohan et al.

(10) Patent No.: US 8,555,183 B2
(45) Date of Patent: Oct. 8, 2013

(54) SOFTWARE-BASED SYSTEM AND METHOD FOR CHANGING STRUCTURAL FEATURE DESIGNATIONS

(75) Inventors: Varinder K. Mohan, Torrance, CA (US); Norman A. Sebby, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 12/365,135

(22) Filed: Feb. 3, 2009

(65) Prior Publication Data
US 2011/0178620 A1 Jul. 21, 2011

(51) Int. Cl.
*G06F 3/048* (2013.01)
(52) U.S. Cl.
USPC ........... 715/764; 715/810; 715/736; 700/105; 700/95; 700/97; 703/6; 703/7; 29/407.1; 705/7.11; 705/7.27
(58) Field of Classification Search
USPC ........................................................ 715/764
See application file for complete search history.

(56) References Cited

U.S. PATENT DOCUMENTS

| | | | | |
|---|---|---|---|---|
| 4,625,396 A * | 12/1986 | Ahmed et al. | .................. | 29/701 |
| 4,937,768 A * | 6/1990 | Carver et al. | ..................... | 703/1 |
| 5,010,634 A * | 4/1991 | Uemura et al. | ............ | 29/407.05 |
| 5,191,534 A * | 3/1993 | Orr et al. | ........................ | 700/105 |
| 5,216,612 A * | 6/1993 | Cornett et al. | .................. | 700/96 |
| 5,295,067 A * | 3/1994 | Cho et al. | ........................ | 705/29 |
| 5,311,438 A * | 5/1994 | Sellers et al. | ................... | 700/96 |
| 5,329,464 A * | 7/1994 | Sumic et al. | ....................... | 703/1 |
| 5,777,877 A * | 7/1998 | Beppu et al. | ...................... | 700/97 |
| 5,806,069 A * | 9/1998 | Wakiyama et al. | ................... | 1/1 |
| 5,953,707 A * | 9/1999 | Huang et al. | .................. | 705/7.25 |
| 5,980,084 A * | 11/1999 | Jones et al. | ...................... | 700/95 |
| 6,035,297 A * | 3/2000 | Van Huben et al. | .......... | 707/695 |
| 6,151,582 A * | 11/2000 | Huang et al. | ................. | 705/7.25 |
| 6,216,109 B1 * | 4/2001 | Zweben et al. | ............... | 705/7.12 |
| 6,230,382 B1 * | 5/2001 | Cunningham et al. | ........ | 29/407.1 |
| 6,317,954 B1 * | 11/2001 | Cunningham et al. | ..... | 29/407.09 |
| 6,647,380 B1 * | 11/2003 | Yotsukura | .............................. | 1/1 |
| 6,766,331 B2 * | 7/2004 | Shema et al. | .......................... | 1/1 |
| 6,871,110 B1 * | 3/2005 | Yen et al. | ....................... | 700/100 |
| 7,024,433 B2 * | 4/2006 | Arai et al. | ............................ | 1/1 |
| 7,031,787 B2 * | 4/2006 | Kalthoff et al. | ............... | 700/105 |
| 7,043,324 B2 * | 5/2006 | Woehler | ........................ | 700/107 |
| 7,100,120 B2 * | 8/2006 | Zimmerman et al. | ......... | 715/777 |
| 7,209,869 B1 * | 4/2007 | Kroger et al. | ...................... | 703/1 |
| 7,246,329 B1 * | 7/2007 | Miura et al. | ................... | 715/810 |
| 7,548,802 B2 * | 6/2009 | Avery et al. | .................. | 701/29.3 |
| 7,653,452 B2 * | 1/2010 | Sauermann et al. | ........... | 700/106 |

(Continued)

OTHER PUBLICATIONS

John Inman et al., A flexible development system for automated aircraft assembly, published on 1996, 4 pages.*

*Primary Examiner* — William Bashore
*Assistant Examiner* — Reza Nabi
(74) *Attorney, Agent, or Firm* — Hanley, Flight & Zimmerman, LLC

(57) ABSTRACT

A software-based system for changing structural feature designations within a production environment includes a menu page component adapted to support a menu page; an information document component interfacing with the menu page component and adapted to support at least one information document having structural feature designations of structural features; and an edit component interfacing with the information document component and adapted to view and edit the structural feature designations to expedite flow of materials in the production environment.

19 Claims, 9 Drawing Sheets

(56) References Cited

U.S. PATENT DOCUMENTS

| | | |
|---|---|---|
| 7,774,225 B2 * | 8/2010 | Cargille et al. ............. 705/7.25 |
| 2002/0052862 A1 * | 5/2002 | Scott et al. .................... 707/1 |
| 2002/0072988 A1 * | 6/2002 | Aram ............................ 705/26 |
| 2002/0143669 A1 * | 10/2002 | Scheer .......................... 705/28 |
| 2002/0178394 A1 * | 11/2002 | Bamberger et al. ............ 714/1 |
| 2002/0186238 A1 * | 12/2002 | Sylor et al. .................. 345/736 |
| 2002/0194057 A1 * | 12/2002 | Lidow .......................... 705/10 |
| 2002/0194190 A1 * | 12/2002 | Shema et al. ............... 707/102 |
| 2003/0050826 A1 * | 3/2003 | Cargille et al. ............... 705/10 |
| 2003/0195963 A1 * | 10/2003 | Song et al. .................. 709/227 |
| 2005/0027654 A1 * | 2/2005 | Adrian .......................... 705/40 |
| 2005/0038553 A1 * | 2/2005 | Sweitzer et al. ............ 700/182 |
| 2005/0181864 A1 * | 8/2005 | Britt et al. ..................... 463/25 |
| 2005/0216421 A1 * | 9/2005 | Barry et al. ................... 705/64 |
| 2005/0289524 A1 * | 12/2005 | McGinnes ................... 717/140 |
| 2006/0015414 A1 * | 1/2006 | Congram et al. .............. 705/28 |
| 2006/0064313 A1 * | 3/2006 | Steinbarth et al. ............. 705/1 |
| 2006/0173953 A1 * | 8/2006 | Salzsauler ................... 709/203 |
| 2007/0124009 A1 * | 5/2007 | Bradley et al. ................ 700/99 |
| 2007/0157127 A1 * | 7/2007 | Moehrle ...................... 715/853 |
| 2007/0162171 A1 * | 7/2007 | McDonald et al. .......... 700/106 |
| 2007/0162360 A1 * | 7/2007 | Congram et al. .............. 705/28 |
| 2007/0226340 A1 * | 9/2007 | Hastings et al. ............. 709/226 |
| 2007/0244702 A1 * | 10/2007 | Kahn et al. .................. 704/260 |
| 2007/0250793 A1 * | 10/2007 | Miura et al. ................. 715/810 |
| 2008/0040197 A1 * | 2/2008 | Seaman et al. ................ 705/10 |
| 2008/0120198 A1 * | 5/2008 | Seaman et al. ................ 705/26 |
| 2008/0288301 A1 * | 11/2008 | Emling et al. ................... 705/4 |
| 2008/0294496 A1 * | 11/2008 | Hall et al. ...................... 705/10 |
| 2008/0300710 A1 * | 12/2008 | Cogswell et al. ............ 700/105 |
| 2009/0125986 A1 * | 5/2009 | Kiester et al. ................... 726/4 |
| 2009/0138871 A1 * | 5/2009 | Kimberly et al. ............ 717/173 |
| 2009/0139078 A1 * | 6/2009 | Fruth et al. ..................... 29/592 |
| 2009/0149743 A1 * | 6/2009 | Barron et al. ................. 600/431 |
| 2009/0172584 A1 * | 7/2009 | Hassan et al. ................ 715/772 |
| 2009/0182702 A1 * | 7/2009 | Miller ............................ 706/60 |
| 2009/0234616 A1 * | 9/2009 | Perkins ........................ 702/184 |
| 2009/0287658 A1 * | 11/2009 | Bennett .......................... 707/3 |
| 2010/0010903 A1 * | 1/2010 | Jeong ............................ 705/18 |
| 2010/0036515 A1 * | 2/2010 | Knipfer et al. ............... 700/105 |
| 2010/0114718 A1 * | 5/2010 | Cho .......................... 705/14.72 |
| 2010/0114941 A1 * | 5/2010 | Von Kaenel et al. .......... 707/769 |
| 2010/0205044 A1 * | 8/2010 | Scheer .......................... 705/10 |
| 2011/0004830 A1 * | 1/2011 | Von Kaenel et al. .......... 715/751 |
| 2011/0029345 A1 * | 2/2011 | Kienzle ........................... 705/8 |
| 2011/0035308 A1 * | 2/2011 | Rosenthal et al. ............. 705/37 |

* cited by examiner

| HOLE CODE | |
|---|---|
| + | PILOTED OR INSTALLED PRIOR TO THIS MI. |
| ① | 401 - AJ INSTALL UNDERSIZE TACK |
| ② | 401 - AJ INSTALL FASTENER |
| ③ | STAYOUT |
| ④ | 401 - AJ DRILL PILOT HOLE |
| ⑤ | DEPT. 17J OR 17T TO INSTALL |
| ⑥ | 101 - AJ PILOT FOR MAJOR JOIN TOOLING |
| | |
| | |
| | |
FIG. 4
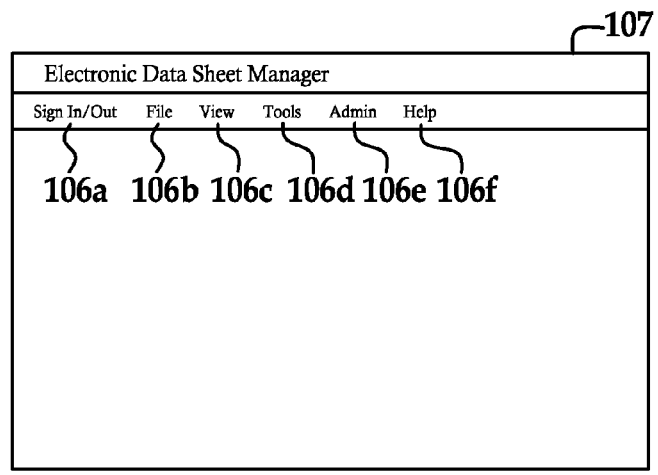
FIG. 5
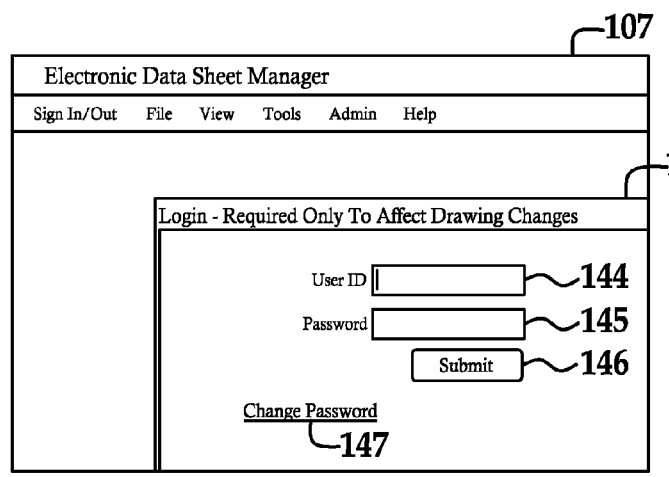
FIG. 6

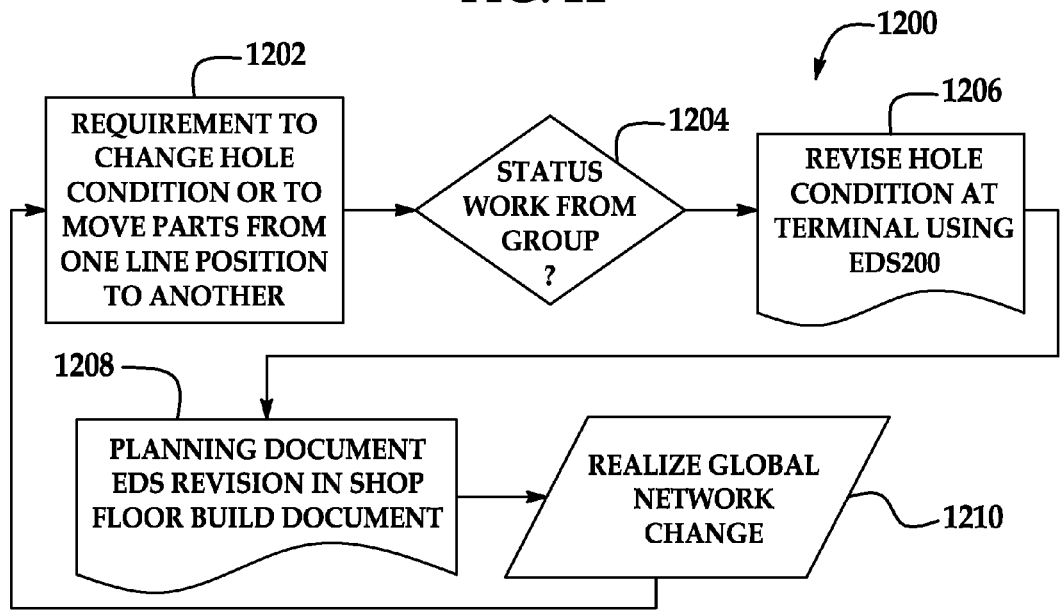

US 8,555,183 B2

SOFTWARE-BASED SYSTEM AND METHOD FOR CHANGING STRUCTURAL FEATURE DESIGNATIONS

TECHNICAL FIELD

The present disclosure relates to systems for changing the build status information of structural features in the fabrication of components for aircraft or other assemblies. More particularly, the present disclosure relates to a software-based system and method for changing structural feature designations relating to the build status of fastener openings or other structural features.

BACKGROUND

In the fabrication of aircraft and other assemblies, it may be necessary to describe the build status of various components such as fastener openings in composite panels, for example and without limitations. The build status may include such information as the line on the panel in which the fastener opening is located, the size of the fastener opening and the type of fastener which is to be inserted in the opening. In a production planning environment, the build status of the components may be frequently edited and updated to optimize the production flow of the components during assembly.

Current methods of documenting the build status of components may include hand-drawing of the build status of the components on instructional sheets. However, this process may be laborious and time-consuming and consequently, may hinder the efficient flow of production. Therefore, the documents may be obsolete at the time of revision completion due to the high flow of changes affected by part and line balancing move efforts. Moreover, production illustrations using this format may be limited to size constraints when large panels or other parts are covered. Current CAD drawings which deliver the information may require manual updates with high administrative costs related to budgeted tool orders and drafting checker hours in a release system.

Therefore, a software-based system and method for expeditiously and efficiently changing structural feature designations relating to the build status of fastener openings or other structural features is needed.

SUMMARY

The present disclosure is generally directed to a software-based system for changing structural feature designations within a production environment. An illustrative embodiment of the system includes a menu page component adapted to support a menu page; an information document component interfacing with the menu page component and adapted to support at least one information document having structural feature designations of structural features; and an edit component interfacing with the information document component and adapted to view and edit the structural feature designations to expedite flow of materials in the production environment.

In some embodiments, the system may include a system comprising menu page component adapted to support a menu page; a login component interfacing with the menu page component and adapted to support a login window; an information document component interfacing with the menu page component and adapted to support a plurality of information documents each having structural feature designations of structural features; a document selection component interfacing with the information document component and adapted to facilitate selection from among the plurality of information documents; and an edit component interfacing with the information document component and adapted to view and edit the structural feature designations of the plurality of information documents; and information technology systems provided in the production environment and interfacing with the system. The system can be adapted to operate in conjunction with the information technology systems to expedite flow of materials in the production environment.

The present disclosure is further generally directed to a software-based method for changing structural feature designations within a production environment. An illustrative embodiment of the method includes providing structural feature designations of structural features of at least one part; providing electronic planning datasets corresponding to the structural feature designations; providing a software-based program adapted to select, view and change the structural feature designations of the structural features; using the software-based program to select and change the structural feature designations of at least one of the structural features; and expediting flow of materials in the production environment by releasing the structural feature designations into a planning system as a new planning configuration control. In some embodiments, the system may include a system comprising a menu page component adapted to support a menu page; a login component interfacing with the menu page component and adapted to support a login window; an information document component interfacing with the menu page component and adapted to support a plurality of information documents each having structural feature designations of structural features of at least one part; a document selection component interfacing with the information document component and adapted to facilitate selection from among the plurality of information documents; a graphic feature representation component interfacing with the information document component and adapted to display the structural features of the at least one part; an area of change component interfacing with the graphic feature representation component and adapted to select the structural feature designations of the structural features for change; an edit component interfacing with the area of change component and adapted to view and edit the structural feature designations of the plurality of information documents; a legend component interfacing with the information document component and adapted to list the structural feature designations; and a change of record component interfacing with the information document component and adapted to display a record of changes of the structural feature designations; and information technology systems provided in the production environment and interfacing with the system. The system can be operated in a first configuration to operate in conjunction with the information technology systems to expedite flow of materials in the production environment. The system can be operated in a second configuration to bypass the information technology systems to expedite flow of materials in the production environment.

In some embodiments, the method may operate outside of or in conjunction with IT systems within a production environment to expedite materials and may include providing build control codes corresponding to structural feature designations of structural features of at least one part; providing electronic planning datasets corresponding to the build control codes; providing a software-based program adapted to select, view and change the build control codes; using the software-based program to select and change at least one of the build control codes of at least one of the structural features; using the software-based program to visually select and view at least one of the build control codes; expediting flow of materials in a production environment by releasing the structural feature designations into a planning system as a new planning configuration control; and providing customer access to the electronic planning datasets.

BRIEF DESCRIPTION OF THE ILLUSTRATIONS

FIG. 4 is an enlarged screen shot of a legend, with multiple changed build control codes indicated on the legend.

FIG. 5 is a screen shot of a menu page component of an illustrative embodiment of the software-based system for changing structural feature designations.

FIG. 6 is a screen shot of a login component of an illustrative embodiment of the software-based system for changing structural feature designations.

FIG. 9 is a screen shot of an edit component used to change build control codes of selected fastener openings in implementation of an illustrative embodiment of the software-based system for changing structural feature designations.

FIG. 10 illustrates fastener openings the build control codes of which have been changed, along with the changed build control codes listed on the legend.

FIG. 11 illustrates a change record on which is recorded the changed build control codes of each fastener opening.

FIG. 12 is a flow diagram which illustrates an exemplary process flow according to an illustrative embodiment of the software-based method for changing structural feature designations.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

The present disclosure is generally directed to a software-based system and method for changing structural feature designations relating to the build status of fastener openings or other structural features in assembly of aircraft or other assemblies. The system and method may facilitate the real-time selecting, viewing and updating of build control codes which correspond to structural feature designations or conditions of the fastener openings or other structural features and release of the updated codes into a planning system for upstream or downstream customer access. The software-based system and method for changing structural feature designations may expedite and streamline the flow of production materials during assembly.

Figure 1:
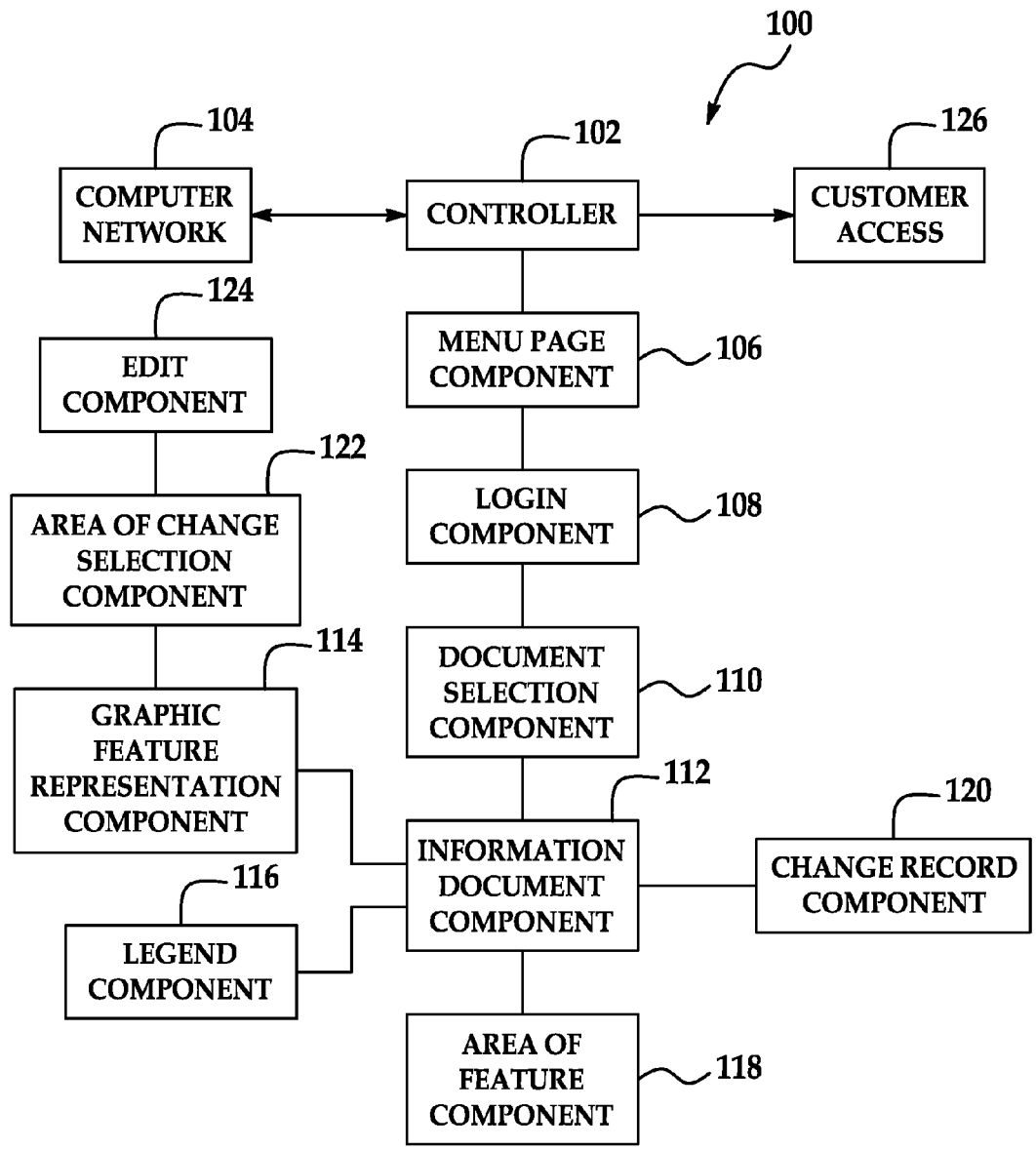
FIG. 1 is a schematic block diagram of an illustrative embodiment of a software-based system for changing structural feature designations.
Figure 1A:
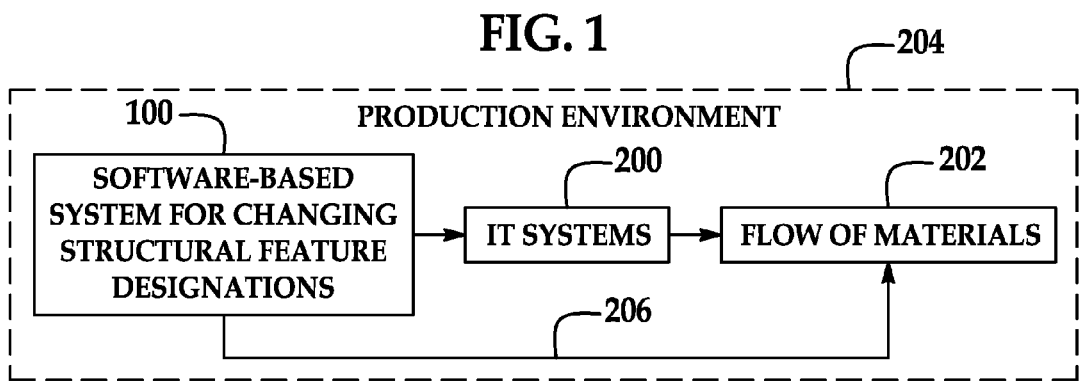
FIG. 1A is a block diagram which illustrates implementation of an illustrative embodiment of the software-based system in a production environment to expedite the flow of materials.
Figure 2:
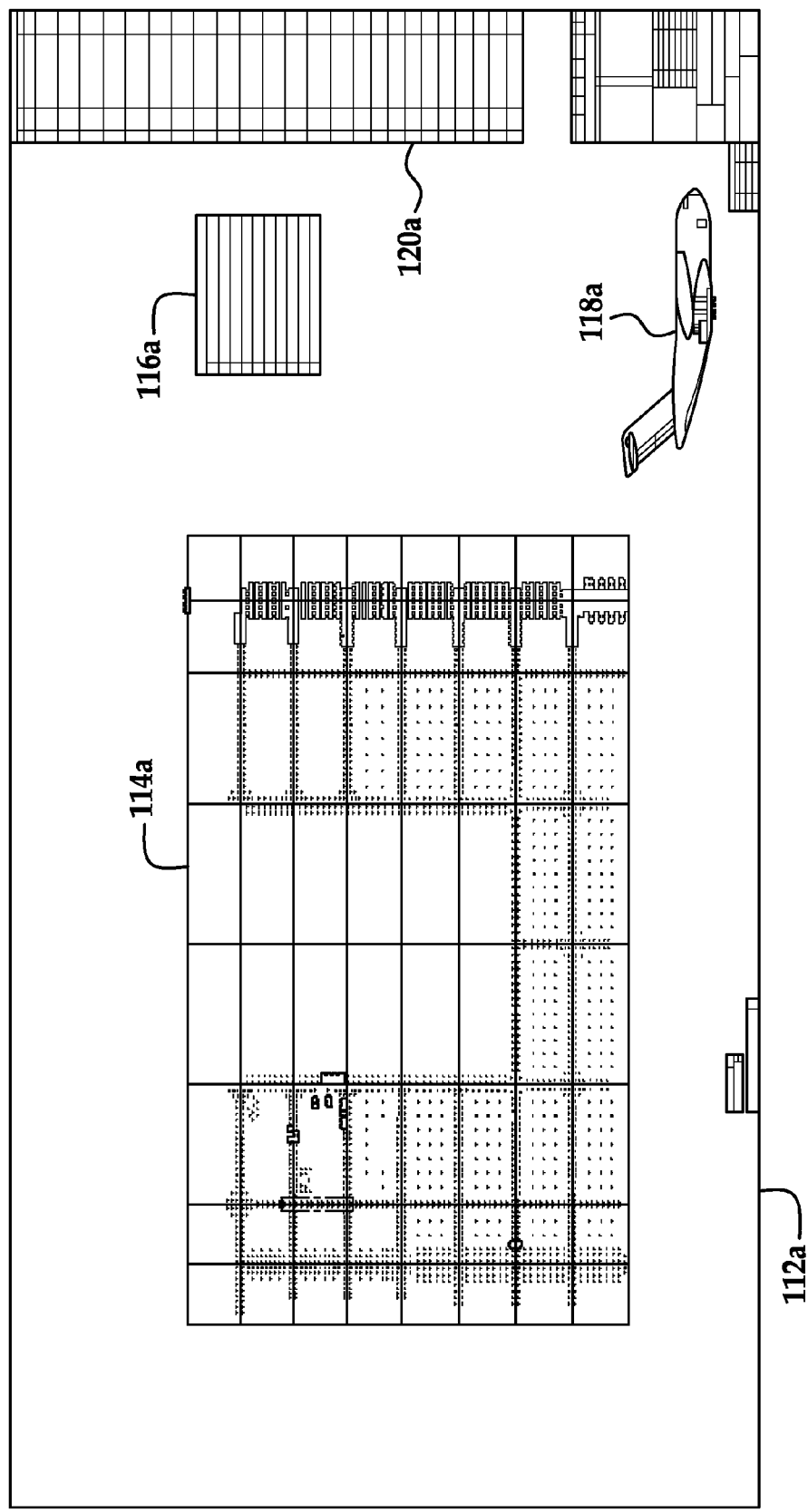
FIG. 2 is a screen shot of an exemplary information document in implementation of an illustrative embodiment of the software-based system for changing structural feature designations.

Referring initially to FIGS. 1, 1A and 2, an illustrative embodiment of the software-based system for changing structural feature designations, hereinafter system, is generally indicated by reference numeral 100 in FIG. 1. The system 100 may include a controller 102. A computer network 104 may interface with the controller 102. As will be hereinafter described, the computer network 104 may enable assembly planning personnel to select, view and change structural feature designations which correspond to build conditions or aspects of structural features of parts used in the assembly of aircraft, for example and without limitation. In some embodiments, the structural features may include various build aspects such as size and fastener type, for example and without limitation, of fastener openings provided in a skin assembly of an aircraft, for example and without limitation. The structural feature designations for the structural features may be listed as build control codes in a line-by-line format, for example and without limitation. The controller 102 may enable upstream or downstream customer access 126 to the updated structural feature designations.

As shown in FIG. 1A, in typical implementation, the system 100 may be adapted to or operate outside the main formal IT systems 200 in a production environment 204 to expedite the flow of materials 202 in the production environment 204. In some applications, the system 100 may be a shop floor planning level tool used to designate and operate in real-time the functions of communicating structural feature designations, such as build features of structural fasteners, for example and without limitation, in a "who, what and where" scenario, providing support change agents or personnel the capability to move structural components while maintaining the correct planned hole condition or other structural feature designation condition from first to last line position in the assembly process. In a first configuration, the system 100 may be adapted to operate in conjunction with the IT systems 200 to expedite the flow of materials 202 within the production environment 204. In a second configuration, the system 100 may bypass 206 the IT systems 200 to expedite the flow of materials 202 in the production environment 204. In some applications, the system 100 may offer personnel robust operational capability using point-click operations, discrete signification of structural feature conditions, menu-driven selections and change records.

The system 100 may include a menu page component 106 adapted to support a menu page 107 (FIG. 5), a login component 108 adapted to support a login window 108a, a document selection component 110 and an information document component 112 which may be accessed via the controller 102. The login window 108a of the login component 108 may be accessed on the menu page 107 of the menu page component 106. A document selection component 110 may be accessible via the login component 108. The document selection component 110 may facilitate selection of any of multiple information documents 112a (FIG. 2) via an information document component 112. The information documents 112a may facilitate the selecting, viewing and changing of structural feature designations which may be mapped or graphically displayed and listed on the information documents 112a. Each information document 112a may correspond to a part used in the assembly of the aircraft or other structure.

The information document component 112 may include a graphic feature representation component 114 which may be adapted to present a graphic representation 114a (FIG. 2) of the part which corresponds to the information document 112a accessed via the information document component 112. The structural features of the part may be presented on the graphic representation. The graphic feature representation component 114 may also include an area of change selection component 122 which may enable selection of the area of the part which includes the structural features the designations of which are to be changed. The area of change selection component 122 may include an edit component 124 which enables production planning personnel to edit or change the structural feature designation or designations which were selected using the area of change selection component 122.

The information document component 112 may also include an area of feature component 118 which may indicate an area of feature 118a (FIG. 2) of the aircraft or other assembly in which the part on the information document 112a is located. The information document component 112 may include a legend component 116 which may be adapted to present a legend 116a (FIG. 2) on which may be listed the structural feature designations of the structural features which are selected using the area of change selection component 122. The structural feature designations may be listed in the legend 116a in a line-by-line format, for example and without limitation. In some embodiments, the structural feature designations may be listed as build control codes in a line-by-line format. The information document component 112 may also include a change record component 120 which may be adapted to present a change record 120a (FIG. 2) that describes the change history of each structural feature designation selected using the area of change selection component 122 and edited using the edit component 124. As shown in FIG. 2, in some embodiments, the graphic representation 114a; the legend 116a; the area of feature 118a; and the change record 120a may be displayed as insets on the information document 112a.

Figure 3:
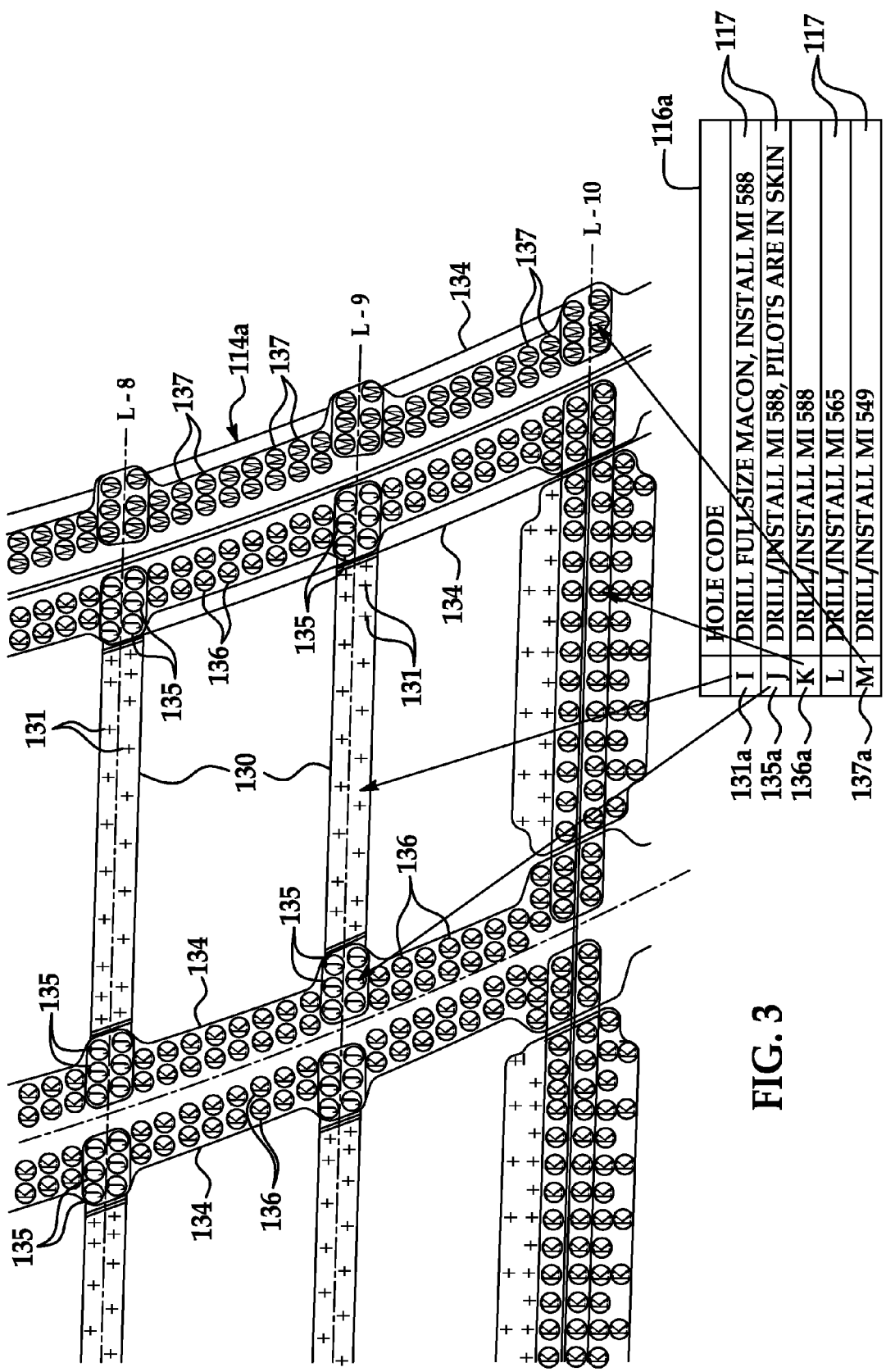
FIG. 3 is a graphic feature representation of a basic IML flat pattern of a skin assembly with a legend having multiple build control code lines corresponding to fastener opening locations on the skin assembly as part of the information page component shown in FIG. 2.

Referring next to FIGS. 3 and 4, in some embodiments, the graphic representation 114a may be a graphic representation of a basic IML flat pattern of a skin assembly used in the assembly of an aircraft, for example and without limitation. The graphic representation 114a may include multiple lines 130 along which are spaced drill sites 131 and multiple intersecting lines 134 along which are spaced fastener openings 135, 136 and 137 of various size and/or type. The legend 116a may include multiple code lines 117 on which may be listed build control codes 131a, 135a, 136a and 137a, respectively, in a line-by-line format. The build control codes 131a, 135a, 136a and 137a listed in the code lines 117 of the legend 116a may correspond to the structural feature designations for the drill sites 131, the fastener openings 135, the fastener openings 136 and the fastener openings 137, respectively, displayed on the graphic representation 114a. The structural feature designations may include such characteristics and aspects as the line on the graphic representation 114a in which the drill site 131 or fastener opening 135, 136, 137 is located; the size of the fastener opening 135, 136, 137; and/or the type of fastener which is to be inserted in the opening, for example and without limitation. As shown in FIG. 4, after changing of the build control codes, such as in a manner which will be hereinafter described, the new build control codes 162 may be displayed on the legend 116a.

An exemplary screen shot of a menu page 106a supported by the menu page component 106 of an illustrative embodiment of the system is shown in FIG. 5. The menu page component 106 may include a sign in/out menu 106a; a file menu 106b; a view menu 106c; a tools menu 106d; an menu 106e; and a help menu 106f.

An exemplary screen shot of the login window 108a supported by the login component 108 of an illustrative embodiment of the system 100 is shown in FIG. 6. The login window 108a may include a user ID entry box 144, a password entry box 145 and a submit button 146. In some embodiments, the login window 108a may additionally include a change password link 147.

Figure 7:
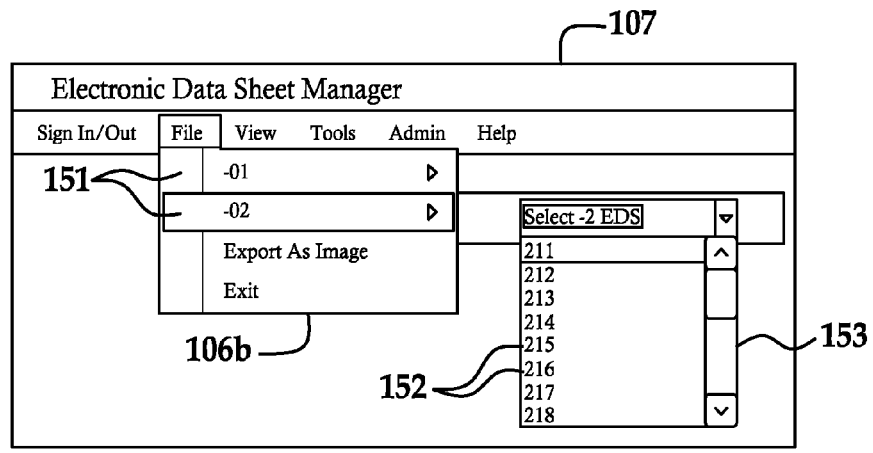
FIG. 7 is a screen shot of a document selection drop menu of an illustrative embodiment of the software-based system for changing structural feature designations.

As shown in FIG. 7, in some embodiments, the file menu 106b of the menu page component 106 may include a line-by-line listing of multiple document series 151, each line of which may correspond to a series of information documents 112a (FIG. 2). Each document series 151 may include a listing of document selections 152 which may be listed in a line-by-line format on a document selection menu 153. Each document selection 152 may correspond to an information document 112a of a part of the aircraft or other assembly.

Figure 8:
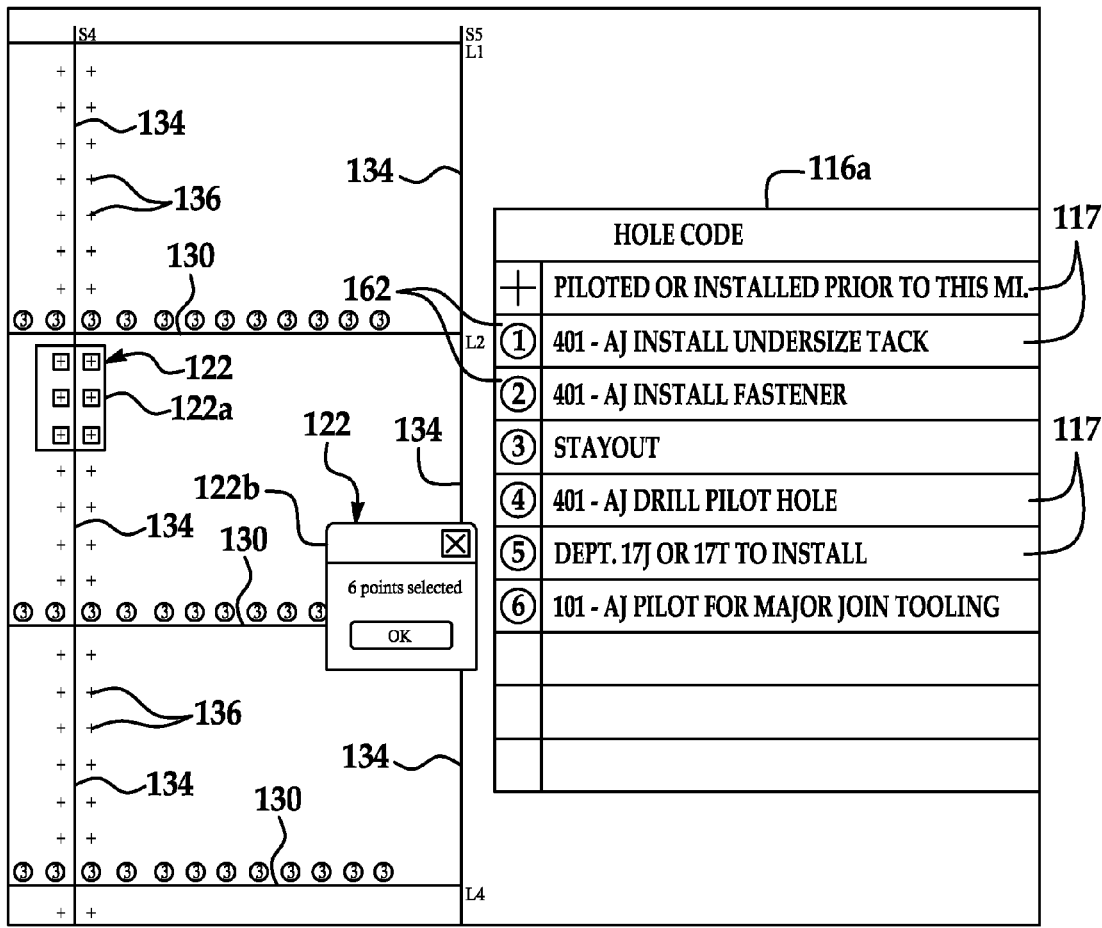
FIG. 8 illustrates an area of change selection component for selecting fastener openings on the information document, the build control codes of which fastener openings are to be changed in implementation of an illustrative embodiment of the software-based system for changing structural feature designations.

FIG. 8 illustrates an exemplary area of change selection component 122 for selecting an area on the information document 112a which corresponds to the locations of the fastener openings 136 the build control codes of which are to be changed. The area of change selection component 122 may include a change selection box 122a which can be selectively extended around the area of fastener openings 136 to be selected. The area of change selection component 122 may additionally include a change selection window 122b which indicates the number of fastener openings 136 that fall within the change selection box 122a. The new selected build control codes 162 which correspond to the fastener openings 136 within the change selection box 122a may be indicated on the code lines 117 of the legend 116a.

Figures 9, 10:
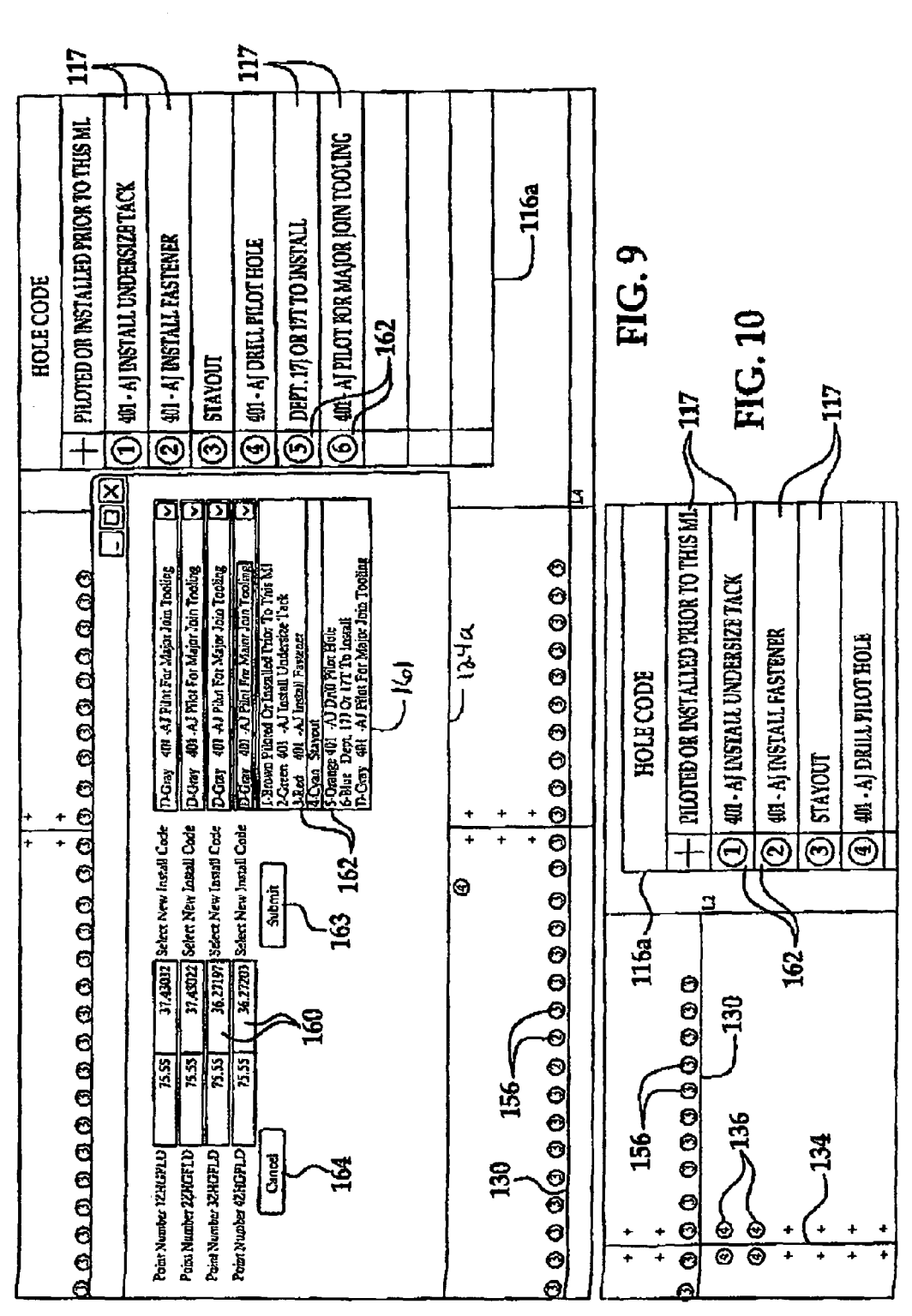

FIG. 9 is a screen shot of an exemplary edit window 124a which may be displayed by selection of the edit component 124 and may be used to change build control codes of selected fastener openings 136 in implementation of an illustrative embodiment of the system. The edit window 124a may include fastener opening locations 160 in which the fastener openings 136 may be entered by reference number, a build control code drop menu 161 of listed build control codes 162 for the respective fastener openings 136, a submit button 163 and a cancel button 164. FIG. 10 illustrates fastener openings 136 the build control codes 162 (FIG. 9) of which have been changed along with the new selected build control codes 162 listed on the legend 116a. FIG. 11 illustrates an exemplary change record 120 on which may be recorded the new selected build control codes 162 (FIG. 10) of each fastener opening.

In typical application, assembly planning personnel (not shown) may access the computer network 104 to implement the system 100 via the controller 102. Accordingly, the login window 109 of the login component 108 (FIG. 6) may be accessed via the menu page 107 of the menu page component 106. A user ID may be typed in the user ID entry box 144 and a password may be typed in the password entry box 145 of the login window 109, after which the user ID and password may be entered by clicking the submit button 146. A password may be selectively changed by clicking the change password link 147.

As shown in FIG. 7, after login, a document series 151 may be selected from the file menu 106b. A document selection 152 may be selected from the document selection menu 153. The information document component 112 (FIG. 1) may then display the information document 112a, as shown in FIG. 2.

As shown in FIG. 8, on the graphic feature representation component 114a of the information document 112a, the area of change selection component 122 may be used to select the fastener openings 136 or other features on the information document 112a the build control code or codes of which are to be selected for viewing or viewing and changing. Accordingly, the change selection box 122a may be extended to enclose the fastener openings 136 or other features which are to be selected. This may be accomplished such as, for example and without limitation, by left-clicking on a mouse (not shown) connected to a computer of the computer network and dragging the edges of the change selection box 122a around the selected fastener openings 136. The number of fastener openings 136 or other features on the graphic feature representation 114a which have been selected using the change selection box 122a may be indicated on the change selection window 122b. The number of fastener openings 136 selected using the change selection box 122a may be confirmed by clicking an "OK" button (not labeled) on the change selection window 122b.

As shown in FIG. 9, the reference numbers of the fastener openings 136 which were previously selected using the area of change selection component 122 (FIG. 8) may appear in the fastener opening locations 160 in the edit window 124a of the edit component 124. The current build control code 162 selected for each fastener opening 136 may appear in the corresponding build control code drop menu 161 for that fastener opening 136. The current build control code 162 may be replaced by another build control code 162 by selecting an alternative build control code 162 from the build control code drop menu 161. The new selected build control code 162 may be selectively saved and released into the system 100 by clicking on the submit button 163. Alternatively, the new selected build control code 162 may be selectively canceled by clicking on the cancel button 164. As shown in FIGS. 9 and 10, the new selected build control code 162 may be indicated on the legend 116a in place of the original build control code 162 for each fastener opening. As shown in FIG. 11, the new selected build control code 162 may additionally be indicated on the change record 120. Accordingly, during production of the aircraft or other assembly, assembly planning personnel (not shown) may select and view the new selected build control codes 162 which reflect the changed structural feature designations of the fastener openings 136 or other structural features of the aircraft or other assembly.

Referring next to FIG. 12, a flow diagram 1200 which illustrates an exemplary process flow according to an illustrative embodiment of the software-based method for changing structural feature designations is shown. In block 1202, a requirement to change a hole condition or move parts from one line position to another is made. In block 1204, a status work from group is formulated. In block 1206, the hole condition is revised or changed using the system. In block 1208, a planning document EDS revision is made in a shop floor build document. In block 1210, the global network change is realized.

Figure 13:
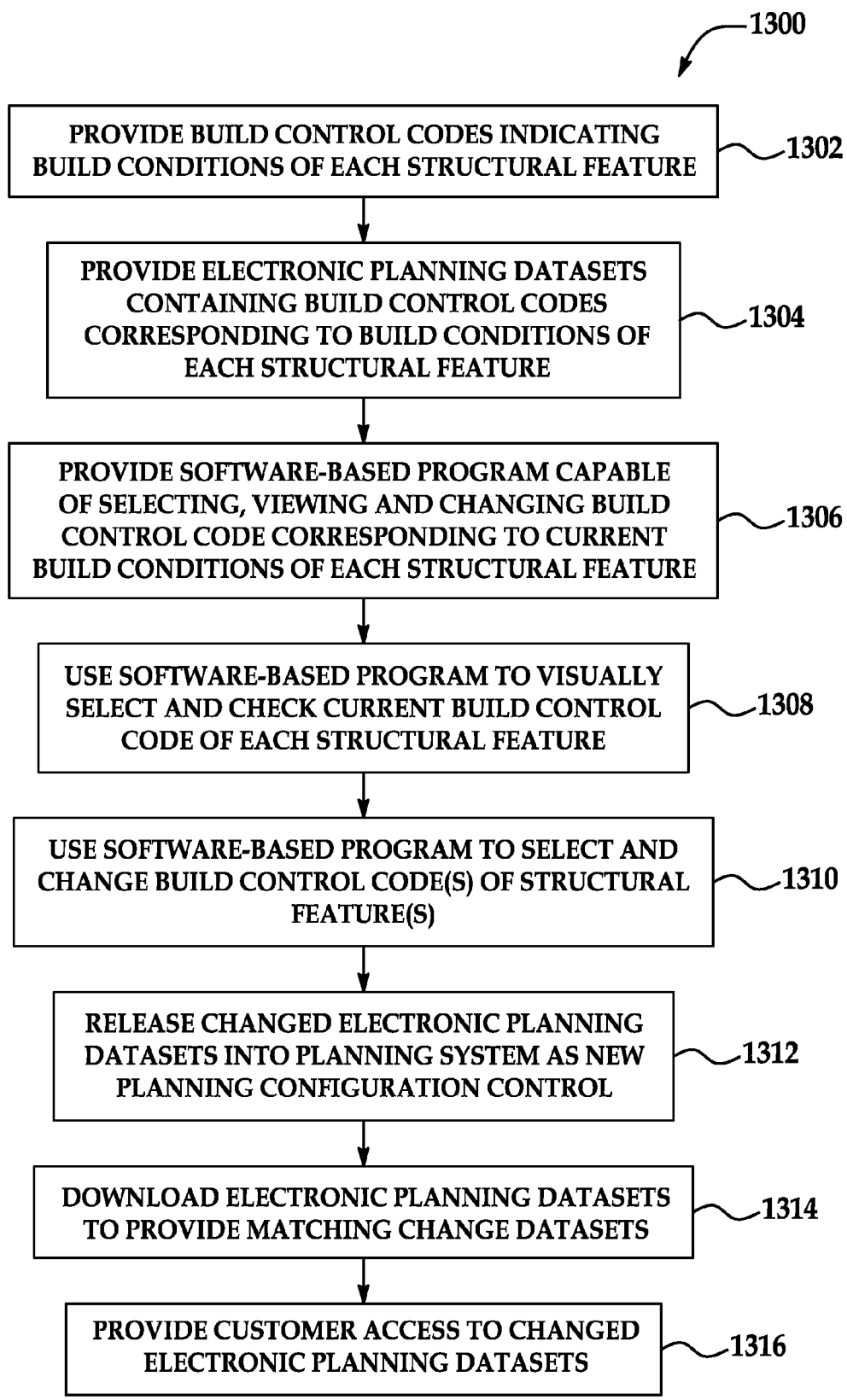
FIG. 13 is a flow diagram which illustrates an illustrative embodiment of the software-based method for changing structural feature designations.

Referring next to FIG. 13, a flow diagram 1300 which illustrates an illustrative embodiment of the software-based method for changing structural feature designations is shown. The structural feature designations may be changed within a production environment, in conjunction with or without the main formal IT systems in the production environment, to expedite the flow of materials in the production environment. In block 1302, build control codes indicating build conditions of each of multiple structural features of a part may be provided. In block 1304, electronic planning datasets containing the build control codes corresponding to the build conditions of each structural feature may be provided. In block 1306, a software-based program which is capable of selecting, viewing and changing the build control code corresponding to the current build conditions of each structural feature may be provided. In block 1308, the software-based program may be used to visually select and check the current build control code of each structural feature. In block 1310, the software-based program may be used to select and change the build control code or codes of a selected structural feature or features. In block 1312, the changed electronic planning datasets may be released into a planning system as a new planning configuration control. Therefore, when the system directs a condition of assembly, the planning designates configuration control of the planned product. In block 1314, the electronic planning datasets may be downloaded to provide matching change datasets. In block 1316, customer access to the changed electronic planning datasets may be provided.

Figure 14:
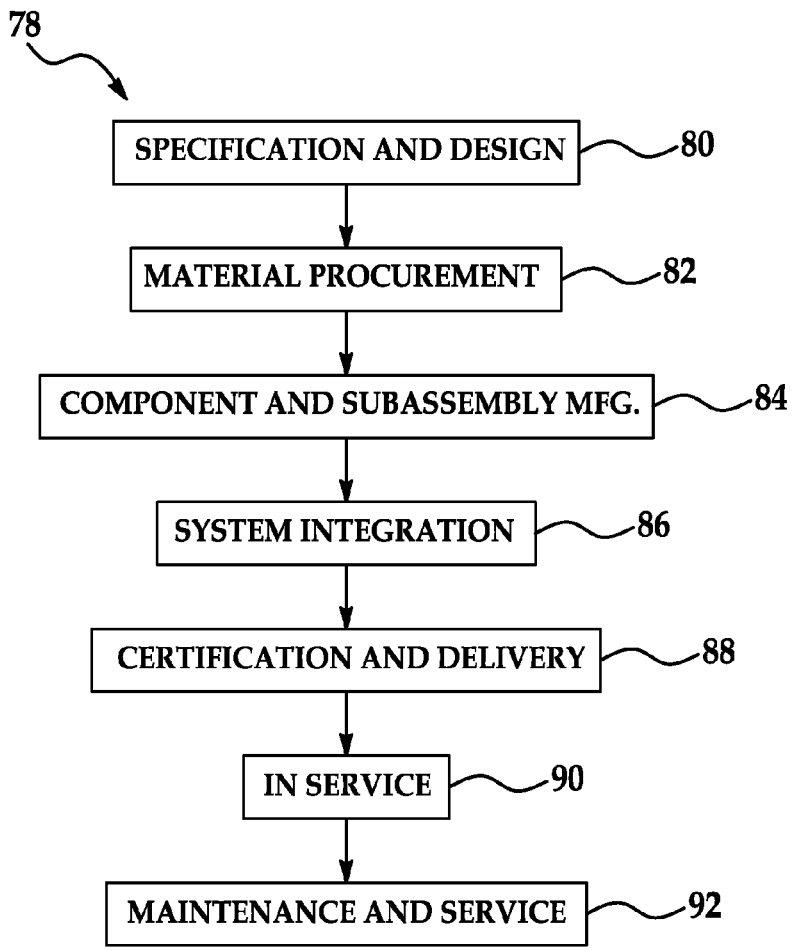
FIG. 14 is a flow diagram of an aircraft production and service methodology.
Figure 15:
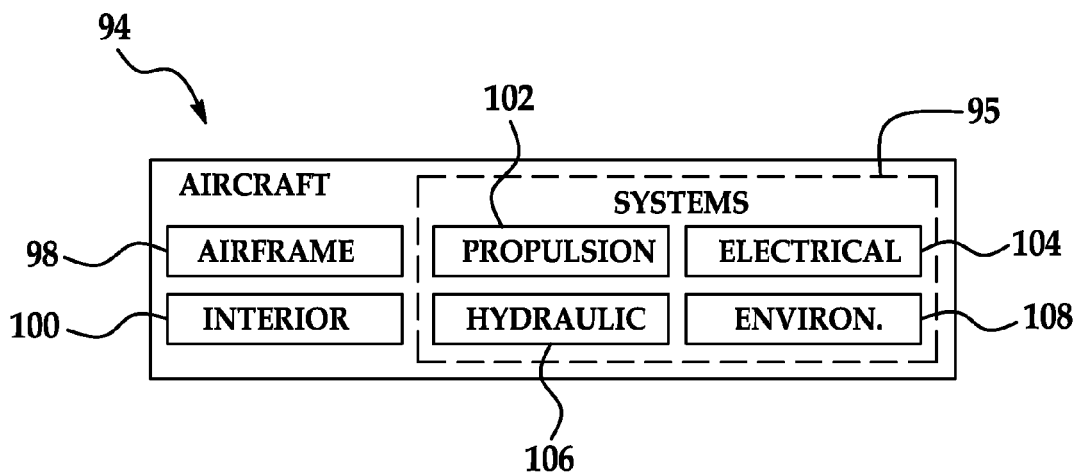
FIG. 15 is a block diagram of an aircraft.

Referring next to FIGS. 14 and 15, embodiments of the disclosure may be used in the context of an aircraft manufacturing and service method 78 as shown in FIG. 14 and an aircraft 94 as shown in FIG. 15. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 94 produced by exemplary method 78 may include an airframe 98 with a plurality of systems 95 and an interior 100. Examples of high-level systems 95 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A system for changing structural feature designations within a production environment including plurality of components implemented using a processor embedded in a computer, comprising:
    a database component to provide electronic planning datasets corresponding to production of a structure;
    an information document component to display a schematic representation of the structure including a plurality of selectable items, each corresponding to a site of the structure;
    a legend component to display a legend including a build code in response to a selection of a first one of the selectable items corresponding to a first one of the sites of the structure, the build code corresponding to a structural feature designation of a fastener opening to be implemented when preparing the first site of the structure for installation of a part; and
    an edit component to enable a user to view and change the structural feature designation of the build code in real time in the production environment in response to a selection of an edit option in connection with one of the selectable items, wherein releasing the change to the structural feature designation into a planning system results in a new planning configuration control.

2. The system of claim 1 further comprising a login component to support a login window.

3. The system of claim 2 wherein the login window comprises at least one of a user ID entry box, a password entry box, a submit button or a change password link.

4. The system of claim 1 further comprising a document selection component to facilitate selection from among a plurality of information documents supported by the information document component.

5. The system of claim 4 further comprising:
    a file menu provided on a menu page;
    a document series provided on the file menu; and
    a document selection menu having a plurality of document selections corresponding to the plurality of information documents selectable from the document selection menu.

6. The system of claim 1 wherein the information document component comprises a graphic feature representation component to support the display of the schematic representation of the structure.

7. The system of claim 1 wherein the information document component comprises a change record component to support a change record associated with changes made to the structural feature designation.

8. The system of claim 1 wherein the structural feature designation to be implemented when preparing the first site of the structure for installation of the part is indicative of a manner of drilling at the first site.

9. The system of claim 1 wherein the edit component is to display a location of the first site separately from the structural feature designation.

10. A non-transitory computer-readable storage device embedded in a computer comprising computer executable instructions that, when executed for changing structural feature designations within a production environment, cause the computer to at least:
    provide electronic planning datasets corresponding to production of a structure;
    display a schematic representation of the structure, the schematic representation including a plurality of selectable items each corresponding to a site of the structure;
    display a legend including a build code in response to a selection of a first one of the selectable items corresponding to a first one of the sites of the structure, the build code corresponding to a structural feature designation of a fastener opening to be implemented when preparing the first site of the structure for insertion of a part; and
    enable a user to view and change the structural feature designation of the build code in real time in the production environment in response to an edit option in connection with one of the selectable items, wherein releasing the change to the structural feature designation into a planning system results in a new planning configuration control.

11. The computer-readable storage device of claim 10 wherein the instructions cause the computer to display a file menu on a menu page, a document series on the file menu and a document selection menu having a plurality of document selections corresponding to a plurality of information documents selectable from the document selection menu.

12. The computer-readable storage device of claim 10 wherein the instructions, when executed, cause the computer to maintain a change record storing changes made to the structural feature designation.

13. The computer-readable storage device of claim 10 wherein the structural feature designation is selectable from one or more predefined build codes.

14. The computer-readable storage device of claim 13 wherein the instructions, when executed, cause the computer to enable the user to view and change the structural feature designation by providing an edit window having at least one build code drop menu corresponding to the structural feature designation and wherein the one or more predefined build codes is selectable from the at least one build code drop menu.

15. A method for changing structural designations within a production environment, comprising:
    providing electronic planning datasets corresponding to production of a structure;
    displaying a schematic representation of the structure including a plurality of selectable items each corresponding to a site of the structure;
    displaying a legend including a build control code in response to a selection of a first one of the selectable items corresponding to a first one of the sites of the structure, the build control of the structure code corresponding to a structural feature designation of a fastener opening to be implemented when preparing the fastener opening at the first site of the structure for installation of a part;
    enabling a user to select and change the structural feature designation of the build control code in real time in the production environment; and releasing the change to the structural feature designation into a planning system as a new planning configuration control.

16. The method of claim 15 wherein the structural feature designation to be implemented when preparing the first site of the structure for installation of the part is indicative of a manner of drilling at the first site.

17. The method of claim 15 further comprising providing customer access to the structural feature designation.

18. The method of claim 15 wherein the build control code comprises identifying information associated with a fastener to be installed at the first site.

19. The method of claim 15 wherein the schematic representation includes a line along which the first site is located.

* * * * *